(12) United States Patent
Hunter et al.

(10) Patent No.: US 6,978,050 B2
(45) Date of Patent: Dec. 20, 2005

(54) ELECTRONIC IMAGE COLOR PLANE RECONSTRUCTION

(75) Inventors: Andrew Arthur Hunter, Stapleton (GB); Stephen B Pollard, Gloucestershire (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 622 days.

(21) Appl. No.: 09/906,626

(22) Filed: Jul. 18, 2001

(65) Prior Publication Data

US 2003/0086606 A1 May 8, 2003

(51) Int. Cl.[7] ............................................. G06K 9/40
(52) U.S. Cl. .................. 382/275; 382/167; 382/264; 382/266; 382/263; 348/241; 358/518; 358/520
(58) Field of Search .......................... 382/162, 167, 382/199, 263, 264, 266, 274, 275; 348/241, 222.1, 272, 273, 453; 358/518, 519, 520, 521, 522, 523; 375/240.25; 396/429; 345/589–593, 596–601, 605

(56) References Cited

U.S. PATENT DOCUMENTS

| 4,176,373 A | | 11/1979 | Dillon et al. |
| 4,642,678 A | | 2/1987 | Cok |
| 5,629,734 A | * | 5/1997 | Hamilton et al. ......... 348/222.1 |
| 6,396,505 B1 | * | 5/2002 | Lui et al. ..................... 345/613 |
| 135,683 A1 | | 9/2002 | Tamama et al. |
| 2002/0135683 A1 | * | 9/2002 | Tamama et al. ............ 348/222 |

FOREIGN PATENT DOCUMENTS

EP 0930789 A2 7/1999
EP 0996293 A2 4/2000

OTHER PUBLICATIONS

Ozawa and Takahashi, "A Corrective Correlative Multiplying (CCM) Method for Chrominance Moire Reduction in Single–Chip Color Video Cameras," *IEEE Transactions on Electronic Devices*, vol. 38, No. 5 (May 1991), pp. 1217–1225.
Gonzalez and Woods, "Digital Image Processing," Addison– Wesley (Reading, Mass.) 1993, pp. 189–201.

* cited by examiner

*Primary Examiner*—Bhavesh M. Mehta
*Assistant Examiner*—Ali Bayat (57) ABSTRACT

This invention relates to the reconstruction of a color plane in image mosaic data with correction for color aliasing artefacts, in particular where the image mosaic data is unequally weighted between different colors. The image mosaic is composed of a plurality of interleaved image pixels of at least three color values, each of which has a luminance value. Each row and column of the mosaic contains image pixels of at least two colors. An edge strength metric is assessed at locations in the image mosaic using at least two luminance values of the same color value to determine the strength of luminance changes and hence of detected edges at said locations. A low spatial frequency image is generated for each color value in which changes in luminance values are smoothed. The smoothing for each color value is in accordance with said edge strength metric so that smoothing at the locations of detected edges is inhibited. A high spatial frequency image is generated from the image mosaic, which combined with the smoothed low spatial frequency images for each color value results in a de-mosaiced color image with reduced or eliminated color aliasing along edges.

16 Claims, 6 Drawing Sheets

Fig. 1

Fig. 2  Black and White

Fig. 3  RGB Mosaic

ELECTRONIC IMAGE COLOR PLANE RECONSTRUCTION

FIELD OF THE INVENTION

This invention relates to the reconstruction of a colour plane in an electronic image formed from image mosaic data, in particular where the image mosaic data is unequally weighted between different colours.

BACKGROUND OF THE INVENTION

It is common to produce consumer colour sensors by introducing an alternating pattern of colour filters onto the array of individual sensor elements. This is often referred to as a colour mosaic and a commonly used variant is the RGB Bayer pattern, which has alternating rows of green/red and blue/green pixels (thus having twice as many green pixels as red and blue) on a regular grid. The goal of colour plane reconstruction (also called de-mosaicing) is to generate a full RGB image from an image captured with such a sensor.

No single colour plane has the full image resolution. In terms of total pixel count, with the Bayer pattern, green has halt the resolution and red and blue each have one quarter. Because each colour plane is sampled at different points of the image, aliasing effects within the colour planes are offset with respect to each other. These effects (colour aliasing artefacts) can appear as conspicuous patterns of false colour in a reconstructed image, especially when the image contains high frequency features such as thin lines and sharp edges.

Lines and edges that are angled away from the horizontal and vertical axes of the filter pattern may cause patterns of rapidly alternating false colours, referred to herein as short range colour aliasing artefacts. For example, if a thin pale line at 45 degrees to the axes of the array lands mostly on a diagonal containing red and blue alternating filters, the reconstructed image may contain false red and blue colours along the line. Lines and edges that lie at angles closer to the horizontal or vertical axes of the filter pattern may cause patterns of much more slowly changing false colours, referred to herein as long range colour aliasing artefacts. For example, if a nearly horizontal thin line begins on a row of the sensor having red and green filters and ends on a row having green and blue filters, the reconstructed image may show the line starting orange and ending blue/cyan.

A number of approaches have been proposed to deal with these problems. Reduced colour aliasing effects are obtained using a method described in U.S. Pat. No. 5,629,734. Here the green channel is processed first using an adaptive interpolation scheme that depends upon both horizontal and vertical intensity local gradient measures (computed from green pixels alone and/or complementary red or blue pixels also). The green signal is interpolated either along the row or column depending which direction has the smallest gradient (if the gradients are equal the average of the row and column interpolation is preferred). The interpolation can involve a correction term derived from the neighbouring red or blue pixels. This results in a complete green image that is free from local patterning whose content is then used to interpolate both the red and blue versions. Thus, image pixels for each colour value in the original mosaic image are directly interpolated to fill in missing pixel locations in such a way as to reduce colour aliasing effects. The bi-directional adaptive techniques used do, however, still require significant processing powering, and zippering effects are not eliminated or reduced as much as may be desirable. This approach does not deal with the problem of long range colour aliasing.

Another approach that does not rely on computation is to optically blur the image before it lands on the image sensor. Various simple demosaicing schemes can then be employed to reconstruct the full RGB image without risk of introducing false colours. Blurring the image avoids the high frequencies that give rise to the artifacts, but the image must be blurred enough to remove features much smaller in size than a 2×2 group of pixels (i.e. smaller than a group of pixels containing at least one of each of the colour filters). This method is employed in almost all digital still cameras. Typically they have a birefringent anti-aliasing filter immediately in front of the sensor to blur the image in a controlled manner. Such cameras avoid long and short range colour aliasing but at the cost of image resolution.

It is an object of the current invention to provide a more convenient and economical apparatus and method for reconstructing a full colour image from image mosaic data, with reduced or eliminated colour aliasing effects.

SUMMARY OP THE INVENTION

According to the invention, there is provided an image processing method for correcting colour aliasing artefacts in an image mosaic, the image mosaic being composed of a plurality of image pixels and each image pixel having one of at least three colour values and having a luminance value representing the intensity of the colour value for that pixel in the image mosaic, the pixels of each colour value being interleaved in rows and columns across the image mosaic with pixels of different colour values to form the image mosaic, the method comprising the steps of:

i) for one or more of the colour values, assessing at locations in the image mosaic an edge strength metric using at least two luminance values of the same colour value at locations in the image mosaic, the edge strength metric being indicative of the strength of luminance changes across said locations, and hence of detected edges at said locations; and ii) generating for each colour value a corresponding low spatial frequency image in which changes in luminance values are smoothed, said smoothing for each colour value being in accordance with said edge strength metric so that smoothing at the locations of detected edges is inhibited.

Also according to the invention, there is provided a device for correcting colour aliasing artefacts in an image mosaic, the device comprising a processor, software, and a memory, in which the memory stores image mosaic data representative of an image mosaic having a plurality of image pixels, said image mosaic data including for each pixel one of at least three colour values and a luminance value representing the intensity of the colour value for that pixel in the image mosaic, the pixels of each colour value being interleaved in rows and columns across the image mosaic with pixels of different colour values to form the image mosaic, wherein the processor, software and memory are operable to:

a) for one or more of the colour values, assess at locations in the image mosaic can edge strength metric using at least two luminance values of the same colour value at locations in the image mosaic, the edge strength metric being indicative of the strength of luminance changes across said locations, and hence of detected edges at said locations; and b) generate for each colour value a corresponding low spatial frequency image in which changes in luminance values are smoothed, said smoothing for each colour value being in accordance with said edge strength metric so that smoothing at the locations of detected edges is inhibited.

The term "edges" as used herein refers to any image details which produce a sudden change in luminance values across the three image pixels used in the assessment of the interpolated images. Therefore, the term edges includes, amongst other fine details: a line dividing relatively dark and bright regions; a thin bright (or dark) line on an otherwise dark (or bright) background; a sudden change in contrast of the image in the shape of a corner; and a single isolated pixel which has a significantly different luminance value than surrounding image pixels.

The method may comprise interpolating between the original image pixels of the image mosaic for said one or more colour values to create additional image pixels of the same colour value at locations in order to produce a corresponding interpolated image for said colour value. This helps to improve the accuracy of the edge detection scheme.

The pixels of each colour value may be interleaved in rows and columns across the image mosaic with pixels of different colour values to form the image mosaic in such a way that at least some rows and/or columns contain image pixels of at least two colours.

In a preferred embodiment of the invention, the edge strength metric is assessed using at least three luminance values for the same colour value at locations that extend along a row and/or a column of the image mosaic. These three or more luminance values used in the assessment of the edge strength-metric may be from at least three or more corresponding adjacent image pixels in the interpolated image for said colour value.

It is particularly advantageous that three image pixels are used in this assessment along a row and/or a column. Long range colour aliasing effects tend to occur when an edge in the image mosaic extend for a large number of pixels within about ±5° of the line of a row or column. Such an edge will therefore cross at essentially rights angles one of the three adjacent pixels used in the assessment of the edge metric.

With many types of images, for example black and white text, edges may be present for all colour values. However, images with colour may have edges not present for all colour values. It is therefore particularly advantageous if the same edge strength metric is used in the smoothing of each interpolated image. The same correction can therefore be applied to all of the interpolated images, whether or not all of the interpolated images have the same edge features. This helps to eliminate colour aliasing effects.

In a preferred embodiment of the invention, at least five adjacent image pixels are used in the assessment of the edge strength metric, with at least some of the adjacent image pixels distributed along both rows and columns of the interpolated image(s). For example, there may be at least three adjacent pixels extending along a row of the interpolated image, and at least three adjacent pixels extending along a column of the interpolated image. In this way, the edge metric can be made more sensitive to edge features not aligned just along a row or a column.

There may be at least five adjacent image pixels arranged in a cruciform pattern. In a preferred embodiment of the invention, there is a central image pixel, and the pattern of adjacent interpolated image pixels is rotationally symmetric to a 90° rotation.

Usually, it will be desirable to calculate the edge strength metric across the full extent of one or more of the interpolated images.

The image mosaic may have a predominance of pixels of one colour value as compared with the other colour values, and with each row and column containing image pixels of both the predominant colour and one of the other colours.

BRIEF DESCRIPTION OF THE DRAWING

The invention will now be described in further detail, by way of example with reference to the following drawings.

DETAILED DESCRIPTION OF THE DRAWING

Figure 1:
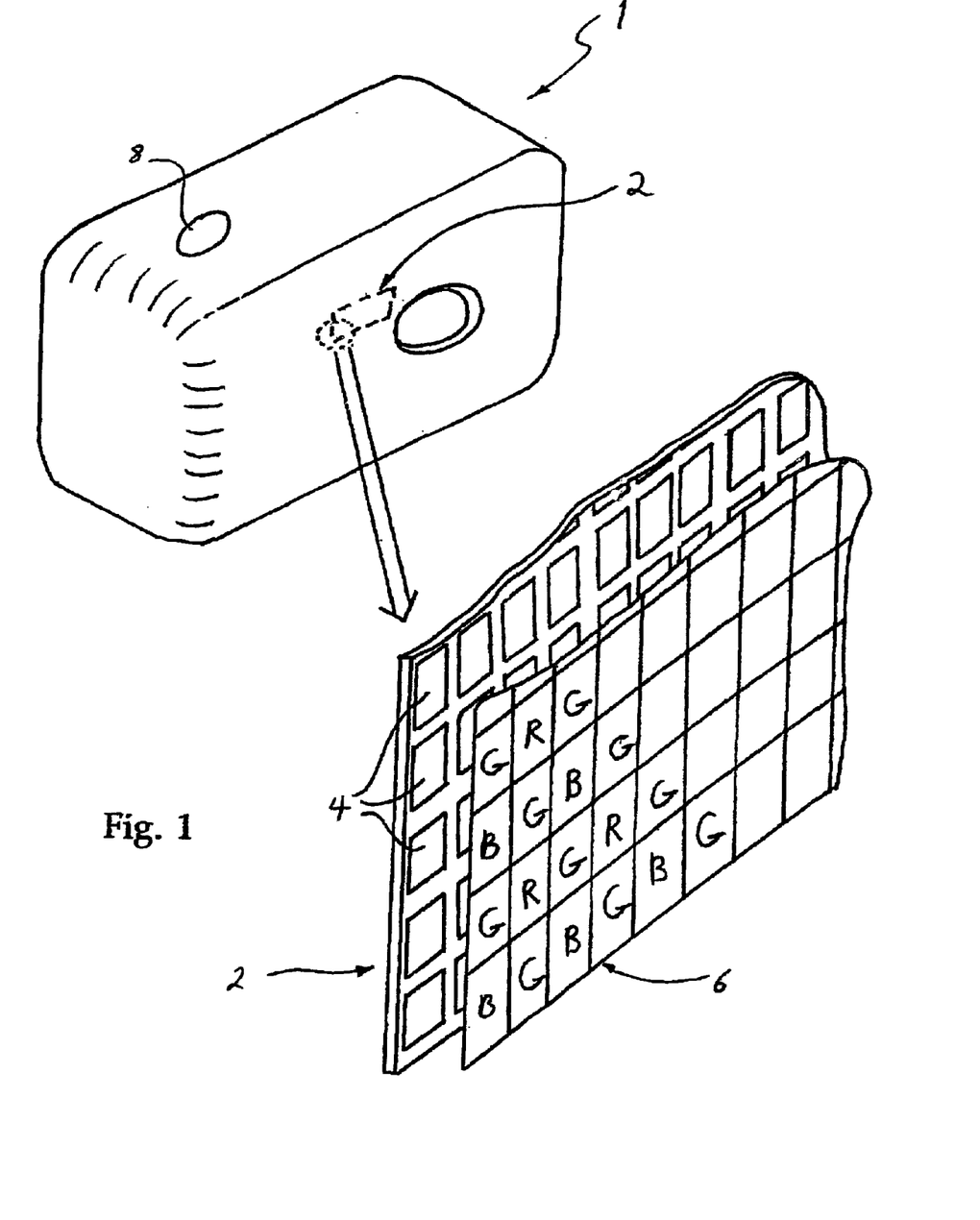
FIG. 1 shows schematically some of the internal components of a conventional electronic camera, including a colour sensor array having red, green and blue (RGB) imaging elements.

FIG. 1 shows one example of a consumer imaging device, here a hand-held digital camera 1. Such cameras have a colour image sensor 2 having a two-dimensional regular array of imaging elements or pixels 4. A typical consumer sensor array may have up to 4 Megapixels resolution, arranged in a rectangular array 2500 pixels wide and 1600 pixels high.

The imaging elements are sensitive to light across a wide spectrum of colours, and so the sensor array 2 is overlain by a mosaic-like pattern of colour filters 6. There are usually only three such colours, red (R), green (G) and blue (B), (RGB) and the colours are usually interleaved in a repeating pattern across the sensor array 2. Thus, the array elements 4 under each colour of filter 6 are sensitive only to light with wavelengths passed by each corresponding filter 6.

Many filter patterns exist, but the most common is the Bayer filter pattern. This consists of pixels with colour filters arranged in a rectangular grid pattern as set out below:

```
G R G R ... G R G R
B G B G ... B G B G
G R G R ... G R G R
...........
B G B G ... B G B G
G R G R ... G R G R
B G B G ... B G B G
``` where R, G and B represent red, green and blue colour filters respectively. For the Bayer pattern, there is a preponderance of green pixels in the sensor array, with these contributing half of the full sensor resolution, while the red and blue pixels each contribute one quarter of the resolution.

Figure 2:
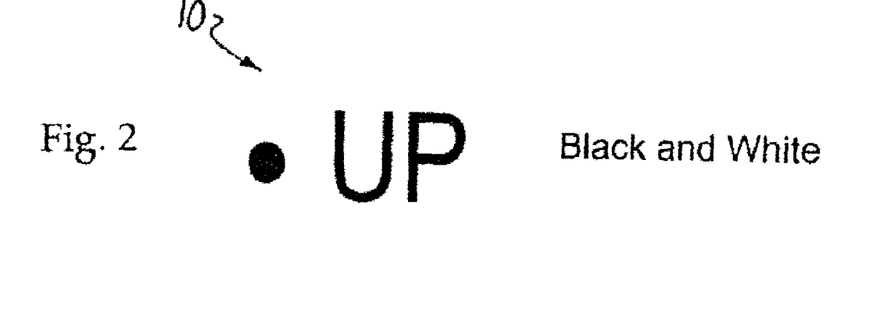
FIG. 2 shows an example of original black and white text to be imaged by a colour sensor array such as that in FIG. 1.
Figure 3:
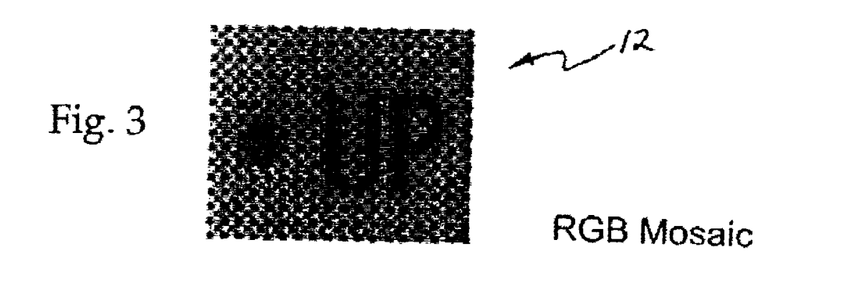
FIG. 3 shows the text when captured as an RGB mosaic image.

FIG. 2 shows an example of original black and white text 10, consisting of the symbols "• UP", to be imaged by the digital camera 1. The text 10 is part of a larger document (not shown) that is to be imaged in a desktop document imaging application. FIG. 3 shows how the text 10 is imaged as an RGB mosaic 12 within a small portion of the sensor array 2 consisting of 35 pixels in a horizontal direction and 29 pixels in a vertical directions The Bayer pattern can be seen most clearly in FIG. 4, which shows for the three colour values red 16, green 17 and blue 18, that there are twice as many green pixels 14 as red pixels 13 or blue pixels 15. The original text 10 is visible as different luminance levels of the pixels 13,14,15.

Figure 5:
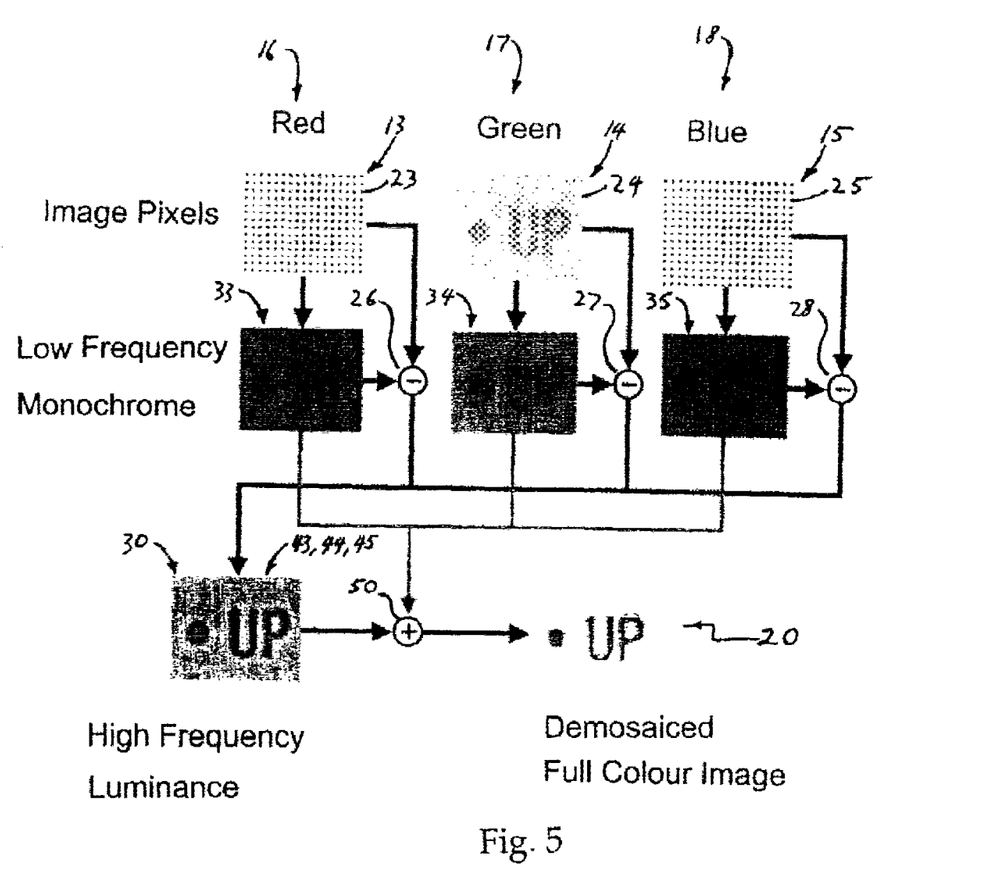
FIG. 5 shows schematically how the red, green and blue pixels are processed in a method according to the invention to yield a de-mosaiced full colour image free from colour aliasing artefacts.

FIG. 5 shows schematically how the image mosaic 12 is processed to yield a de-mosaiced full colour image 20. First, for each colour value 16,17,18, a smoothed image 33,34,35 is formed. As will be explained in greater detail below in relation to FIGS. 6 and 7, prior to smoothing of the image mosaic, an edge quality metric is generated from an interpolated image, which is then used together with the edge quality metric in a smoothing process to inhibit smoothing at edge features. The smoothed images 33,34,35 therefore contain low frequency image information, but without contribution from erroneously coloured pixels close to edges. This is particularly beneficial in reducing or eliminating colour aliasing effects in many types of image.

Then, for each of the three colour values 16,17,18, a difference is taken 26,27,28 between the luminance level of each individual pixel 13,14,15 for that particular colour value 16,17,18, and a corresponding point of the smoothed image of the same colour value. This difference 26,27,28 is used to generate an achromatic high frequency image which when combined with similar differences for the other two colour values results in a composite achromatic high frequency image 30 that extends across all pixels locations in the original RGB image mosaic 12.

Therefore, the resulting composite image 30 is a black and white high frequency version of the original RGB image 12. Most conveniently, the high frequency image 30 consists of three sets of high frequency image pixels 43,44,45 at locations in the composite image 30 that correspond with the locations of corresponding sets of pixels 13,14,15 in the original RGB mosaic image 12. As can be seen in FIG. 5, these pixels 43,44,45 have different luminance values.

Then, for each high frequency pixel 43,44,45, the achromatic high frequency luminance value is added 50 to a corresponding portion of each of the three smoothed images 33,34,35, which results in a de-mosaiced full colour image 20.

This method has the advantage of being relatively easy to compute in electronic hardware, while still giving good reconstructed image quality having reduced or eliminated colour aliasing.

The process described above can be represented mathematically as follows. Let the smoothed versions of the red R, green G and blue B pixels 13,14,15 be labelled $R_s$, $G_s$ and $B_s$ respectively, where the subscript letter "S" stands for "smoothed". Each of the smoothed monochrome images 33,34,35 is formed by two-dimensional interpolation combined with low-pass filtering, except at detected edge features, which are either not filtered or are low-pass filtered to a lesser degree. Here, the smoothed images 33,34,35 are formed individually for each of the three colour values 16,17,18 using bilinear interpolation as a pre-processing step. All three smoothed images 33,34,35 then extend across locations corresponding with all elements of the RGB mosaic pattern 12.

The high frequency component of each mosaic pixel (given by subtracting the original mosaic value from the smoothed value of the same colour at the same point) is added to the values of the other smoothed colours for that pixel in order to generate the other two missing colours as below.

| At a Red Pixel | At a Green Pixel | At a Blue Pixel |
|---|---|---|
| $G = G_s + R - R_s$ | $R = R_s + G - G_s$ | $R = R_s + B - B_s$ |
| $B = B_s + R - R_s$ | $B = B_s + G - G_s$ | $G = G_s + B - B_s$ |

Figure 4:
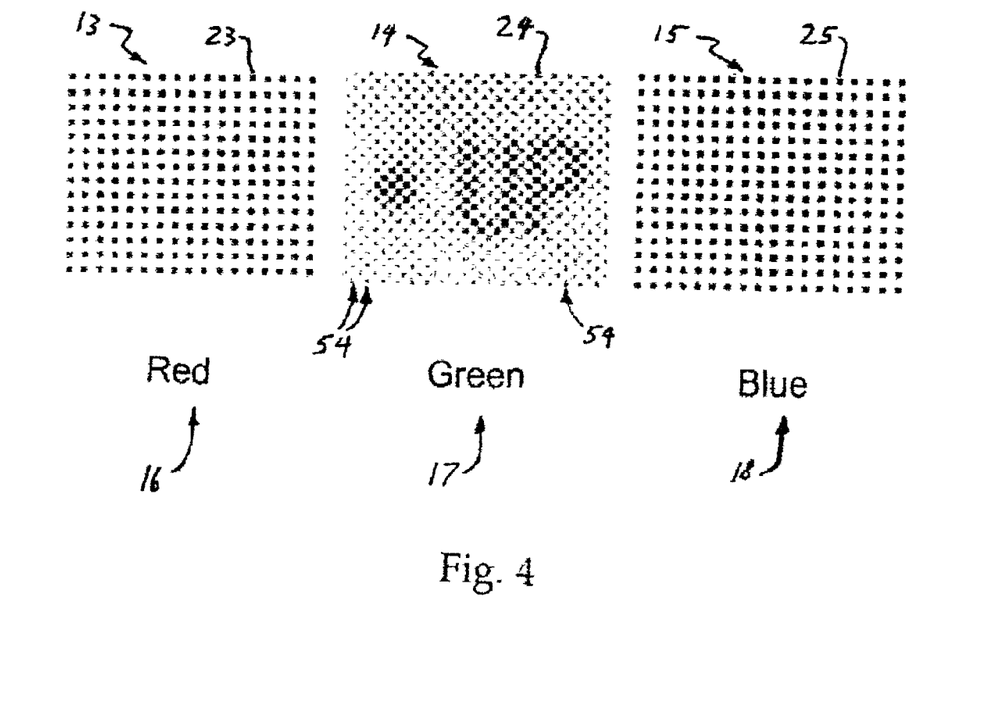
FIG. 4 shows the arrangement of red, green and blue pixels in the image mosaic of FIG. 3.

To reduce the computation required for the de-mosaicing process, it is possible to reduce the number of mosaic pixel locations at which the mosaic pattern is spatially filtered to produce the low spatial resolution images. This results in smoothed images with lower spatial frequencies than might otherwise be the case (unless the degree of smoothing is itself reduced to accommodate the change in spatial resolution), but at no great ultimate loss in information content, for the reason that image details are reintroduced by adding the high frequencies as described above. Preferably, smoothed images are computed only for a subset of the green pixels 14, for example as shown in FIG. 4 those green pixels in columns 54 (or alternatively rows) having both green pixels 14 and red pixels 13. For the Bayer pattern, this requires one quarter of the computation while the image quality remains almost constant.

For red and blue pixels this amounts to avoiding the initial interpolation stage and operating the smoothing on images formed from the raw red and blue pixels alone.

Performing image smoothing at the lower spatial resolution necessitates the need to generate intermediate smoothed intensity values for those pixel locations that have been excluded from the smoothing process. Preferably this can be achieved by explicitly interpolating (bi-linearly) smoothed green, red and blue pixels to the full mosaic resolution prior to subsequent operations. During this process, it is particularly advantageous to allow for the relative offset of the different low resolution colour pixel planes during the interpolation process in order to reduce or eliminate colour aliasing effects. This is achieved by offsetting each interpolated smooth colour plane according to the position of the pixel plane (used to construct the low resolution version) within the Bayer pattern.

Therefore, each of the high spatial frequency images 44,45,46 is formed for each of the colour values 16,17,18 from the difference 26,27,28 between the luminance values of the image mosaic pixels 16,17,18 for that colour value and corresponding portions of the smoothed monochrome image 33,34,35 for that same colour value 16,17,18.

In other words, the high frequency component of each mosaic pixel is given by subtracting the mosaic value from the corresponding location of a smoothed version of the image for the same colour value.

The de-mosaiced full colour image 20 is then formed for each of the colour values 16,17,18 by summing each of the high spatial frequency images 30 with corresponding portions of the smoothed monochrome images 33,34,35 for that colour value.

Figure 6:
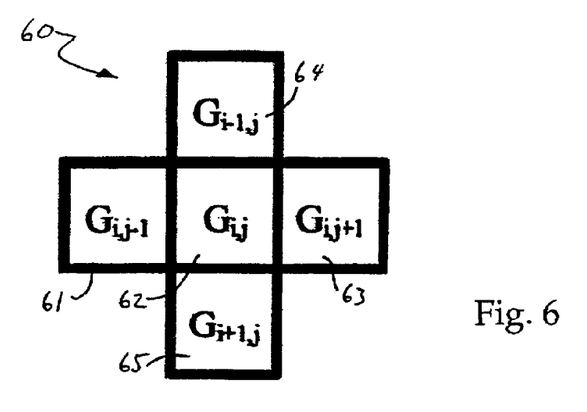
FIG. 6 shows a pattern of five image pixels used to calculate an edge quality metric across-image the pixels.

The image smoothing process will now be described in detail, with reference to FIGS. 6 and 7. For simplicity of operation, each of the red green and blue images 13,15 of the underlying mosaic 12 are first interpolated to the full resolution of the mosaic using standard bilinear demosaicing.

However in some applications it may be preferable (in image quality terms) to use information from combinations of the individual red, green and blue sub-images 13,14,15 of the image mosaic 12. The additional image pixels from one colour value 16,17,18 could be generated from luminance values of image pixels 23,24,25 of that colour value and at least one other colour value. For example, the green channel 17 could be interpolated using one of the improved adaptive schemes that also incorporates red and blue pixels 23,25.

In order to generate a smooth image 33,34,35 that is free from colour aliasing artefacts an edge strength metric is computed for each pixel. With some types of image, it is important, in order to avoid introducing new colour artefacts, that the edge strengths used to smooth each image are the same.

In order to reduce the computational complexity, it is preferable if the edge strength metric is assessed using image pixels 23,24,25 having just one of the colour values. One approach is to use edge strengths computed in the green interpolated image to smooth all three images. Green is a good choice as it has twice the original pixel count of red and blue (and more if it has incorporated red and blue pixels into its interpolation) and tends to more closely match perceived tonal edges. Alternatively edge strengths from all three image planes can be combined (by simple addition or sum of squares). In our experiments the extra computation involved in computing edge strengths for all, three images did not result in improved image quality.

While edge strength metrics (denoted $E_{i,j}$ for the $j^{th}$ pixel along the $i^{th}$ row of the full resolution interpolated images) can be computed using various methods, it is preferred here to base the calculation on taking differences of luminance values between one or more adjacent pairs of original and interpolated additional image pixels. As shown in FIG. 5, the calculation uses an arrangement 60 of five pixels 61–65 taken from the interpolated image. For the Bayer pattern, if the central pixel 62 is an original pixel, each of the four adjacent pixels 61,63,64,65 will be one of the additional pixels generated by interpolation, and vice versa.

A measure of edge strength $E_{i,j}$ that is proportional to the square of the actual edge difference is then calculated according to:

$$E_{i,j} = (G_{i,j} - G_{i,j-1})^2 = (G_{i,j} - G_{i,j+1})^2 = (G_{i,j} - G_{i-1,j})^2 = (G_{i,j} - G_{i+1,j})^2$$

As can be seen, the edge strength metric is a sum of squares of differences of adjacent luminance values. This measure of edge strength gives good results and avoids the need to perform a square root operation. This approach has the additional advantage that it assigns strength to pixels on either side of an edge and also includes thin bar edges that might be missed by a simpler edge detection method that compares just two adjacent image pixels.

For a generic two-dimensional spatial smoothing filter, such as a standard one with a Gaussian Profile, the modified edge inhibiting smoothing process is as follows.

For simplicity, consider a square N×N smoothing filter (where N is generally an odd number to allow the filter to be centered on the pixel to be smoothed) with elements $F_{m,n}$ then the edge inhibited smooth version of the of the i,j$^{th}$ element in the green channel is given by $S_{i,j}$ according to:

$$SumLevel_{i,j} = \sum_{m=1-N}\sum_{n=1-N} \frac{F_{m,n}G_{I+m,j+n}}{E_{I+m,j+n}}$$

-continued $$SumEdge_{i,j} = \sum_{m=1-N}\sum_{n=1-N} \frac{1}{E_{I+m,j+n}}$$

$$S_{i,j} = \frac{SumLevel_{i,j}}{SumEdge_{i,j}}$$

$$I = i - \left\lfloor \frac{N}{2} \right\rfloor, J = j - \left\lfloor \frac{N}{2} \right\rfloor$$

A less general but computationally attractive way to perform image smoothing is use an N×N block averaging filter. The smooth image is generated by taking the mean of the pixels in an N×N neighbourhood centered on the pixel whose smooth value is to be computed. The advantage of block averaging is that it can be computed very quickly using the running sums method. This requires just two additions and two subtractions per pixel and is independent of the size of the accumulation neighbourhood. The method does require some additional storage for the partial sums (up to 32 bits for each element times the row length).

The running sums method is based upon the fact that for a one dimensional summation the sum for pixel i is related to the sum for pixel i–1 according to the simple recurrence relationship:

$$Sum_i = Sum_{i-1} + I_{1+\frac{N}{2}} - 1_{i-\frac{N}{2}-1}$$

Where $I_1$ is the intensity of the $i^{th}$ a pixel in the one dimensional image.

Figure 7:
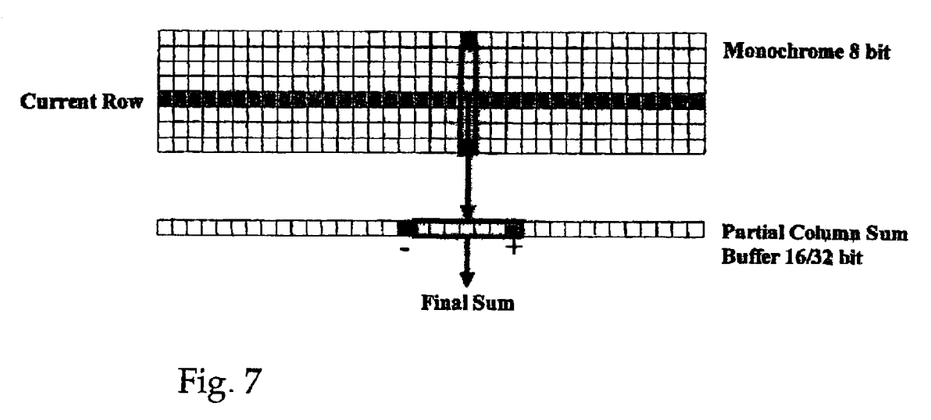
FIG. 7 illustrates a two-dimensional running sums method for performing smoothing of image pixels.

FIG. 7 shows how to extend this simple idea to two dimensions using a buffer of partial column sums. At the top of each image it is necessary to initialise the partial column sum buffer using the first N rows; this gives the sum for the N/2=1 row. (assuming integer arithmetic) of the image. Then for each subsequent row it is only necessary to subtract the intensity values of the row N/2+1 above the current row and add the intensity values of the row N/2 below the current row to the elements of the partial column sum buffer. Example pixels are shown red and green in the figure for the subtracted and added intensity values respectively. The partial sums are themselves accumulated in an analogous fashion resulting in the generation of a final summation value for each pixel in row column order.

It is also possible to provide a version of edge inhibited smoothing based upon this approach. In order to do this it is necessary to first generate two new images: ImLevel which is given by the product of the original image with the inverse of the edge strength; and ImEdge which is just the inverse of the edge strength image (suitably scaled). In either case the inverse computation can be carried out with a look up table.

Now consider a process that accumulates these two images in lockstep (i.e. generating accumulated values for the same pixel location one after the other). To save memory requirements this process can be carried out in lockstep with the creation of the individual pixel values of ImLevel and ImEdge so that they do not require explicit representation. Then in this way it is possible to generate the sums SumLevel$_{ij}$ and SumEdge$_{ij}$ with little computational effort This still leaves one division per pixel to recover the final edge inhibited smoothing value (which is given by SumLevel$_{i,j}$/SumEdge$_{i,j}$). This can also be avoided by restricting the number of valid values of 1/E$_{ij}$ (suitably scaled). We have found that it is possible to get good results where the inverse weighting factor in, after suitable scaling, allowed to take on only those values between 1 and 20. Thus for a 7×7 neighbourhood (also found to be a good value in practice) SumEdge$_{i,j}$ is restricted to take on the integer values between 49 and 980. In such cases the division can be well approximated (to within a single intensity level) using the integer formulation:

$$S_{i,j}=(SumLevel_{i,j} \times LUT[SumEdge_{i,j}]+(1<<(N-1)))>>N$$

where $$LUT[t]=((1<<N)+t/2)/t$$

That is, rather than dividing SumLevel$_{i,j}$ by SumEdge$_{i,j}$ we compute a nearly equivalent result through the much computational cheaper route of multiplication and right shift N bits (the latter is equivalent to dividing by (1<<N)). The value we must multiply by to do this is (1<N)/SumEdge$_{i,j}$. As there are a limited set of values for SumEdge$_{i,j}$ all possible values of (1<<N)/SumEdge$_{i,j}$ can be pre-computed and stored in the look up table, LUT.

Note that, because it is desirable to round the results of integer arithmetic rather than truncate them, half the divisor is added to the numerator before integer division in each of the calculations above.

The accuracy of this division avoiding integer computation will depend on the choice of N (larger values give more precision). The choice of N is itself restricted by the size of SumLevel$_{i,j}$ as SumLevel$_{i,j}$,<<N must always fir within the number of bits used to represent an integer value.

Figure 8:
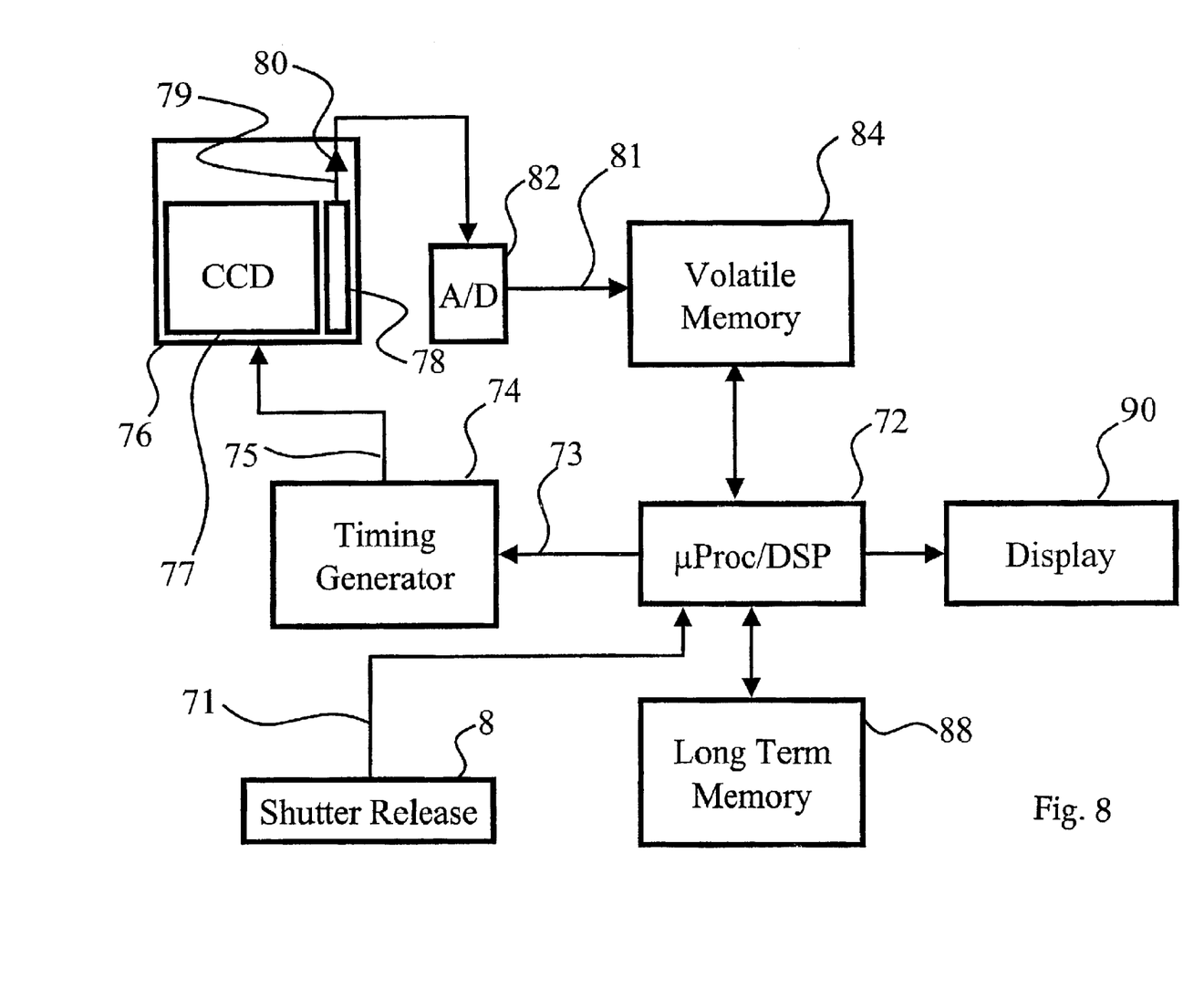
FIG. 8 is a circuit schematic diagram for a device according to the invention for de-mosaicing an image mosaic to form a full colour image, the device comprising a processor, software, and a memory.
Figure 9:
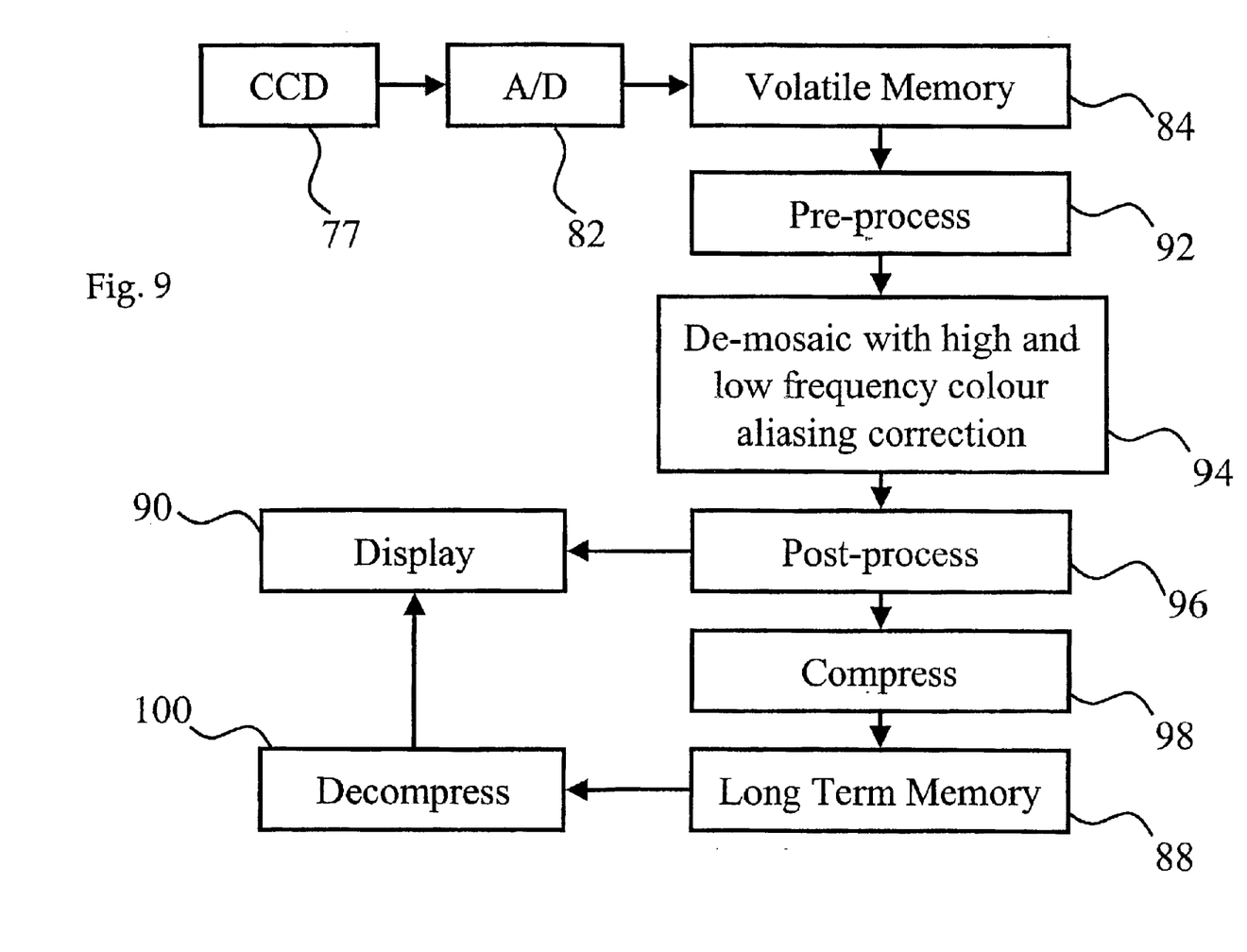
FIG. 9 is a flow chart illustrating a preferred embodiment of the method according to the invention for de-mosaicing an image mosaic to yield a full colour image.

The process described above may be readily implemented in hardware, illustrated in block schematic form in FIG. 8, and illustrated in the flowchart of FIG. 9.

A shutter release mechanism 8 when activated by a user sends a signal 71 to a microprocessor unit 72, which may include a digital signal processor (DSP). The microprocessor then sands an initiation signal 73 to a timing generator 74, whereupon the timing generator sends a trigger signal 75 to an electronic image sensor unit 76.

The sensor 76 consists of an imaging area 77 consisting of an array of sensing elements (typically either of a photogate or alternatively photodiode construction) and a serial readout register 78 from where an analogue signal 79 is generated via an amplifier 80. This signal 79 is generated upon receipt by the sensor unit 76 of the trigger signal 75.

The amplified analogue signal 79 is converted to a digital signal 81 by an A/D unit 82. The resulting raw digital image data is stored temporarily in a volatile memory 84.

Image processing according to the present invention can then be performed by the microprocessor unit 72. The microprocessor may include additional DSP capability in the form of specialised block of hardware to carry out specific functions or an additional more general DSP co-processor.

The processing itself may be performed according to the steps outlined in the flow-chart of FIG. 9. These include a pre-processing stage 92, which may typically include correction of the OECF (opto-electronic conversion function) of the sensor and white-balancing to compensate for variations in illumination. Following the colour aliasing correction and de-mosaicing stage 94 described above, a subsequent post-processing stage 96 may include exposure correction (which can also be accomplished at the pre-processing stage) and transformation to a standard colour space such as sRGB (as described in IEC 61966-2-1). Finally the reconstructed RGB image data can be compressed 98 and stored in long term memory 88 using a standard image compression scheme such as the ubiquitous JPEG scheme.

Additionally a display device 90 may be incorporated into the design. Images can be displayed live to facilitate viewfinding or reviewed from long term memory requiring an additional decompress processing stage 100.

Although a preferred embodiment of the invention has been described with reference to the Bayer pattern of image pixels, the invention is applicable to cases where not all rows and/or columns contain image pixels of at least two colours. For example, some mosaics have pure green rows or columns interleaved with red/blue rows or columns. The invention is equally applicable to such image mosaics.

It is not strictly necessary to store the whole raw image frame in volatile memory. The image processing can be performed on the fly, thus requiring only as much memory as is necessary to perform the imaging pipeline. So after the first few rows of image data have been read from the sensor into memory it is possible to generate compressed image data for the start of the image and begin storing these in long term memory. This results from the fact that all processes are essentially local and operate only on a limited area of the image.

In other words, although the "images" constructed at each stage or the process could be complete sets of data that extend across the entire image, in practice this adds cost in terms of memory and possible throughput. Therefore, the "images" used at each stage of the process will in general be created piecemeal, with the process operating locally. In the limit all the computation may be carried out for a single pixel from the pixels in its neighbourhood.

The invention described above maintains image detail from all of the sensor elements while reconstructing a full RGB image free from visible colour aliasing effects. It can be incorporated into any scheme that is based upon the combination of an achromatic high frequency image with low frequency red, green and blue images (or other primary colour combinations). Preferably it is incorporated into an additive reconstruction scheme whereby the achromatic high frequencies are added to each of the low frequency colour channels.

One way in which this scheme differs from prior art is in the way the smoothed colour images are created. Rather than generate a standard smooth or low-pass image using filtering in the spatial or frequency domains (which can only remove short range aliasing artefacts), this scheme uses an edge inhibited spatial smoothing technique. The contributions to the smoothing filter are weighted inversely with the local edge strength. Smoothing at locations at or along an edge is therefore inhibited relative to locations more distance from an edge. In this way the modified low-pass images are free from long and short range colour aliasing artefacts. Once low-pass images are obtained, an achromatic high-pass version can be computed according to the previously disclosed methods. One such method is to subtract an interpolated green channel from the edge inhibited smoothed green channel. The high-pass version can then be added back to each of the low-pass versions to obtain a final de-mosaiced image that has high frequency content yet is in many cases free from all colour aliasing artefacts.

The method described above for reconstructing a full colour image from image mosaic data is computationally attractive and utilises all three colour values of the mosaic to produce high resolution colour images. The method has been shown to be particularly suited to images containing text, particularly monochrome images, and achieves a high quality full colour image at a modest cost in terms of computational complexity.

Compared with prior art approaches that use a birefringent filter to achieve a controlled defocus on the sensor array, the invention permits up to approximately a four-fold resolution improvement, as well as allowing a cost reduction by eliminating a birefringent crystal in an imaging device.

The invention therefore provides an efficient method for reconstructing a high quality image with the full sensor resolution in each of the red, green and blue colour channels.

What is claimed is:

1. An image processing method for correcting colour aliasing artefacts in au image mosaic, the image mosaic being composed of a plurality of image pixels and each image pixel having one of at least three colour values and having a luminance value representing the intensity of the colour value for that pixel in the image mosaic, the pixels of each colour value being interleaved in rows and columns across the image mosaic with pixels of different colour values to form the image, the method comprising the steps of:

i) for one or more of the colour values, assessing at locations in the image mosaic an edge strength metric using at least two luminance values of the same colour value at locations in the image mosaic, the edge strength metric being indicative of the strength of luminance changes across said locations, and hence of detected edges at said locations; and ii) generating for each colour value a corresponding low spatial frequency image in which changes in luminance values are smoothed, said smoothing for each colour value being in accordance with said edge strength metric so that smoothing at the locations of detected edges is inhibited.

2. An image processing method as claimed in claim 1, in which in step i) the method comprises interpolating between the original image pixels of the image mosaic for said one or more colour values to create additional image pixels of the same colour value at locations in order to produce a corresponding interpolated image for said colour value.

3. An image processing method as claimed in claim 2, in which the edge strength metric is assessed using at least three luminance values for the same colour value at locations that extend along a row and/or a column of the image mosaic.

4. An image processing method as claimed in claim 3, in which said at least three luminance values used in the assessment of the edge sigh metric are from at least three corresponding adjacent image pixels in the interpolated image for said colour value.

5. An image processing method as claimed in claim 1, in which the same edge strength metric is used in the smoothing of each low spatial frequency image.

6. An image process method as claimed in claim 1, in which the additional image pixels from one colour value are generated from luminance values of image pixels of said colour value and at least one other colour value.

7. An image processing method as claimed in claim 6, in which said at least five adjacent locations are in a cruciform pattern.

8. An image messing method as claimed in claim 1, in which at least five luminance values from corresponding locations in the image mosaic are used in the assessment of the edge strength metric, including at least three adjacent locations extending along a row of the image mosaic, and at least three adjacent locations extending along a column of the image mosaic.

9. An image processing method as claimed in claim 1, in which there is a central luminance value from a corresponding central location used in the assessment of the edge metric.

10. An image processing method as claimed in claim 1, in which the edge sigh metric is calculated across the fill extent of the image mosaic for one or more of the colour values.

11. An image processing method as claimed in claim 1, in which there is a predominance of pixels of one colour value as compared with the other colour values, each row and column containing luminance values of both the predominant colour and one of the other colours.

12. An image processing method as claimed in claim 11, in which the assessment of the edge strength metric involves taking differences of luminance values between one or more adjacent pairs of original and additional image pixels.

13. An image processing method as claimed in claim 1, in which the colour values comprise red, green and blue, theme being a preponderance of green pixels in the image mosaic.

14. An image processing method as claimed in claim 1, in which the edge strength metric is assessed using luminance values of just one of the colour values.

15. An image processing method as claimed in claim 1, in which the edge strength metric is a sum of square of differences of adjacent luminance values.

16. A device for correcting colour aliasing artefacts in an image mosaic, the device comprising a processor, software, and a memory, in which the memory stores image mosaic data representative of an image mosaic having a plurality of image pixels, said image mosaic data including for each pixel one of at least three colour values and a luminance value representing the intensity of the colour value for that pixel in the image mosaic, the pixels of each colour value being interleaved in rows and columns across the image mosaic with pixels of different colour values to form the image mosaic wherein the processor, software and memory are operable to:

a) for one or more of the colour values, assess at locations in the image mosaic an edge strength metric using at least two luminance values of the same colour value at locations in the image mosaic, the edge strength metric being indicative of the strength of luminance changes across said locations, and hence of detected edges at said locations; and b) generate for each colour value a corresponding low spatial frequency image in which changes in luminance values are smoothed, said smoothing for each colour value being in accordance with said edge strength metric so that smoothing at the locations of detected edges is inhibited.

* * * * *